R. WHIPPLE.
AUTOMATIC STEERING AND CONTROL MECHANISM FOR TRACTORS.
APPLICATION FILED DEC. 3, 1918.
1,296,027.  
Patented Mar. 4, 1919.
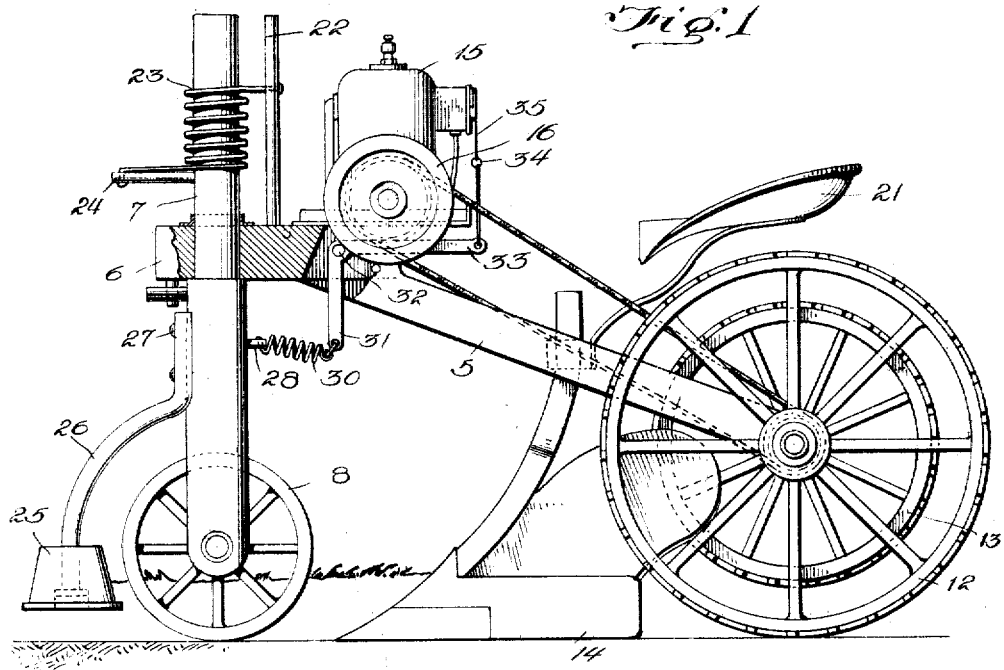
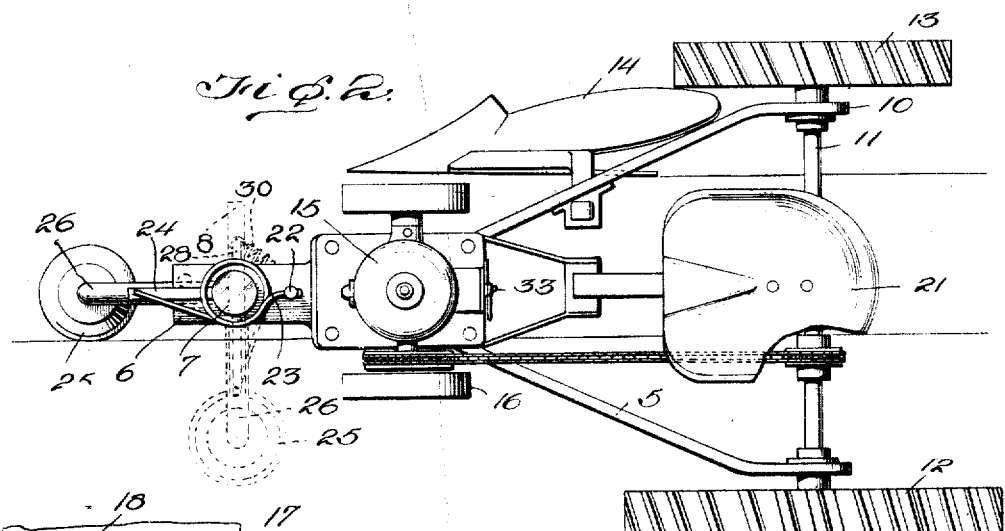
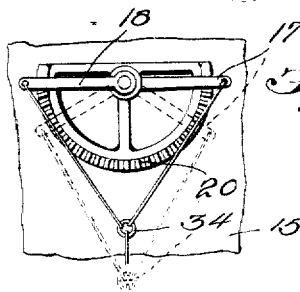
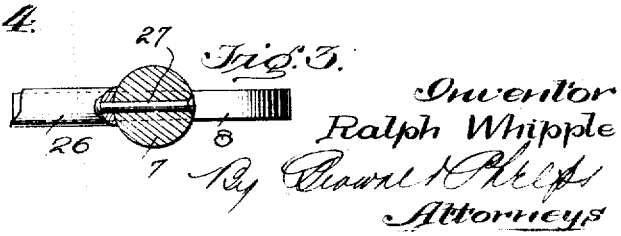
Inventor  
Ralph Whipple  
By Beard & Phelps  
Attorneys

UNITED STATES PATENT OFFICE.

RALPH WHIPPLE, OF DETROIT, MICHIGAN.

AUTOMATIC STEERING AND CONTROL MECHANISM FOR TRACTORS.

1,296,027.  Specification of Letters Patent.  Patented Mar. 4, 1919.

Application filed December 3, 1918. Serial No. 265,146.

*To all whom it may concern:*

Be it known that I, RALPH WHIPPLE, a citizen of the United States, residing at Detroit, in the county of Wayne and State of Michigan, have invented certain new and useful Improvements in Automatic Steering and Control Mechanism for Tractors, of which the following is a specification.

This invention relates to tractors and more specifically to automatic steering and control mechanism for agricultural tractors particularly adapted for plowing, harrowing and the like where after the first furrow is dug the tractor is adapted to automatically move in lines parallel thereto.

One of the objects of the present invention is to provide a simple and practical mechanism of the above general character which may be inexpensively manufactured and installed. A further object is to provide a mechanism of the above general character adapted to be applied to automobile tractors and so designed as to automatically stop the tractor should the same for any reason leave its predetermined course.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, in which—

Figure 1 is an elevational view with certain parts shown diagrammatically with the invention applied thereto;

Figs. 2, 3 and 4 are detail views.

Referring now to the drawing in detail, 5 denotes a frame of substantially Y-shaped construction having at its head end 6 a single post 7 carrying a wheel 8 at its lower end adapted to travel in a furrow. The rear ends 10 of the frame are supported near opposite ends of an axle 11 provided with a large tractor wheel 12 which may travel in a previously formed furrow while at the opposite side is a smaller wheel 13 adapted to travel on the normal ground level. The frame carries a plow 14 or other soil engaging implement of any desired type and this, of course, may be moved up and down or its relative angle changed in any desired manner. These parts are all of more or less standard construction and detailed description thereof is believed to be unnecessary.

At the forward part of the frame 6 is mounted an engine 15 provided with a power delivering device such as a fly wheel 16 connected in any suitable manner with the rear axle 11 for driving the tractor wheels. Controlling mechanism, consisting of a gas lever 17 and spark lever 18, are mounted on a suitable segment 20 in front of the driver's seat 21 convenient for operation. Adjacent the engine 15 is a stud or other suitable fixed member 22 to which one end of a spiral spring 23 surrounding the post 7 is adapted to be secured. The opposite end of this spring is secured to a lug or post 24 upon the member 7 and is adapted to turn therewith. This spring is so tensioned as to normally hold the wheel 8 at right angles to the line of travel but by reason of a pilot roller 25 carried on a bent arm 26 detachably secured to the member 7 by bolt 27 and which roller is adapted to travel against the wall of the furrow whereby the wheel 8 is kept in a line substantially parallel to the line of movement.

The member 7 is provided with a rearwardly extending lug 28 to which is connected a flexible member such as spring 30, the opposite end of which spring is secured at 31 to the end of a bell crank lever pivoted at 32 on the frame of the machine. The opposite end 33 of this bell crank lever is secured by means of a ring 34 and branch lines 35 to the spark and gas controls, as shown in Fig. 2. It will thus be seen that the wheel 8 will be permitted to have a certain amount of lateral movement to follow the normal curvature of the furrow. If, however, the pilot device and wheel 8 leave the furrow the post 7 will be instantly snapped around to right angle position by reason of the spiral spring 23. This movement will cause a pull to be exerted upon the connection 30 to actuate the bell crank lever and to depress its rear end 33 to draw down the spark and gas control levers to stop position, thereby instantly and automatically shutting off the engine.

By reason of this construction the tractor is substantially automatic in its operation and after the initial furrow has been made and the tractor started, it will continue to plow automatically in lines parallel to the initial furrow unless by accident the tractor leaves its predetermined course under which circumstances the engine is immediately shut off, as above described.

The invention is of simple and practical construction and reliable and efficient in use and operation and is believed to accomplish among others all of the objects and advantages herein set forth.

I realize that considerable variation is possible in the details of construction and arrangement of parts without departing from the spirit of my invention, and I therefore do not intend to limit myself to the specific form shown and described.

I claim:

1. In combination with a tractor provided with a source of power and control means therefor, steering mechanism, a pilot device connected with said steering mechanism and adapted to travel in a furrow and to be held from turning by contact with the wall thereof, means for holding said pilot device against the furrow wall, and connections between the steering mechanism and the power control adapted to be actuated by the steering mechanism when the same is turned by said holding means as the pilot device turns from contact with the furrow wall.

2. In combination with a tractor provided with a source of power and control means therefor, steering mechanism comprising a wheel-equipped post, a pilot device connected with said post and adapted to travel in a furrow and against the wall thereof, means tending to normally turn said steering mechanism and pilot device to a position at right-angles to the tractor frame, and connections between the steering mechanism and the power control adapted to be actuated by the steering mechanism when the same is turned by said turning means when the pilot device turns from contact with the furrow wall.

3. In combination with a tractor provided with a source of power and control means therefor, steering mechanism comprising a wheel-equipped post, a pilot device removably connected with said post and consisting of a roller adapted to travel in a furrow and against the wall thereof, a spring normally tending to turn said steering mechanism and pilot device to a position at right-angles to the tractor frame, and connections between the steering mechanism and the power control adapted to be actuated by said steering mechanism when the pilot device turns from contact with the furrow wall.

In testimony whereof I affix my signature in presence of two witnesses.

RALPH WHIPPLE.

Witnesses:
F. L. BROWNE,
K. E. KLEIN.